US 6,625,754 B1

(12) United States Patent
Aguilar et al.

(10) Patent No.: US 6,625,754 B1
(45) Date of Patent: Sep. 23, 2003

(54) AUTOMATIC RECOVERY OF A CORRUPTED BOOT IMAGE IN A DATA PROCESSING SYSTEM

(75) Inventors: Maximino Aguilar, Austin, TX (US); Yuan-Chang Lo, Austin, TX (US); Robert Ellington Millican, Jr., Austin, TX (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/527,397

(22) Filed: Mar. 16, 2000

(51) Int. Cl.⁷ .............................. G06F 11/00; H04L 1/22
(52) U.S. Cl. ........................................ 714/15; 717/174
(58) Field of Search ............................. 714/15, 38, 42, 714/2, 5, 13, 20, 18, 25, 39; 713/1, 100; 717/174, 168, 177; 709/221, 201, 203

(56) References Cited

U.S. PATENT DOCUMENTS

| | | | | |
|---|---|---|---|---|
| 5,732,268 A | * | 3/1998 | Bizzarri | 395/652 |
| 5,765,151 A | * | 6/1998 | Senator | 707/8 |
| 5,935,242 A | * | 8/1999 | Madany et al. | 713/1 |
| 6,175,917 B1 | * | 1/2001 | Arrow et al. | 713/1 |
| 6,195,695 B1 | * | 2/2001 | Cheston et al. | 709/221 |
| 6,209,088 B1 | * | 3/2001 | Reneris | 713/1 |
| 6,230,285 B1 | * | 5/2001 | Sadowsky et al. | 714/14 |
| 6,259,442 B1 | * | 7/2001 | Britt, Jr. et al. | 345/327 |
| 6,314,532 B1 | * | 11/2001 | Daudelin et al. | 714/38 |
| 6,330,715 B1 | * | 12/2001 | Razzaghe-Ashrafi | 717/11 |
| 6,381,694 B1 | * | 4/2002 | Yen | 713/2 |
| 6,385,707 B1 | * | 5/2002 | Maffezzoni | 711/162 |
| 6,453,469 B1 | * | 9/2002 | Jystad | 717/174 |

* cited by examiner

*Primary Examiner*—Nadeem Iqbal
(74) *Attorney, Agent, or Firm*—J. Bruce Schelkopf; Carstens Yee & Cahoon LLP

(57) ABSTRACT

A method and apparatus in a data processing system for automatically restoring an operating system on a local storage device. Prior to loading the operating system, a determination is made as to whether the operating system on the local storage device is corrupted in response to starting the data processing system. If the operating system is corrupted, the operating system is repaired using code from a source storage device without loading the operating system.

27 Claims, 3 Drawing Sheets

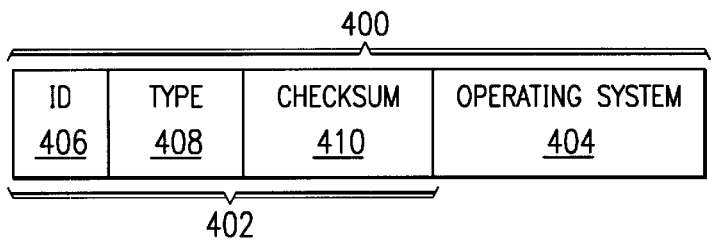
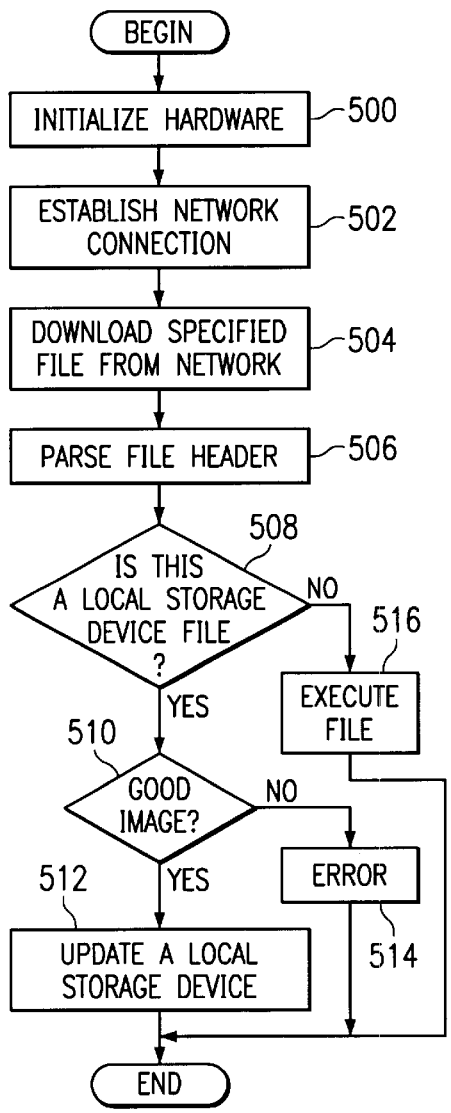
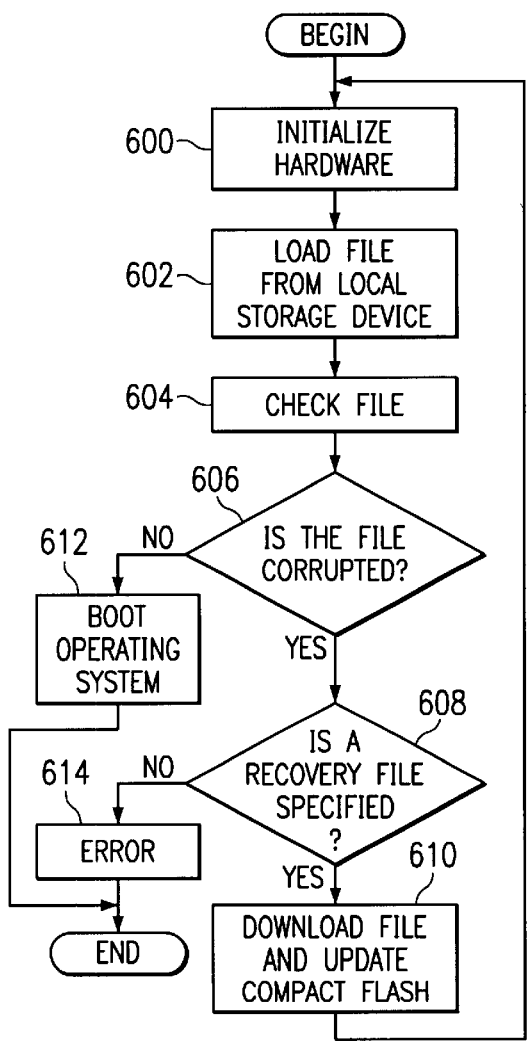

AUTOMATIC RECOVERY OF A CORRUPTED BOOT IMAGE IN A DATA PROCESSING SYSTEM

CROSS REFERENCE TO RELATED APPLICATIONS

The present invention is related to applications entitled METHOD AND APPARATUS FOR UPDATING BOOT CODE IN A DATA PROCESSING SYSTEM ON A LOCAL STORAGE DEVICE, Ser. No. 09/527,398; METHOD AND APPARATUS FOR COPYING A BOOTABLE IMAGE FROM A NETWORK TO A LOCAL BOOT DEVICE IN A DATA PROCESSING SYSTEM, Ser. No. 09/527,399; all of which are filed even date hereof, assigned to the same assignee, and incorporated herein by reference.

BACKGROUND OF THE INVENTION

1. Technical Field

The present invention relates generally to an improved data processing system and in particular to a method and apparatus for copying data in a data processing system. Still more particularly, the present invention relates to a method and apparatus for copying a bootable image from a network to a local boot device in a data processing system.

2. Description of Related Art

On a computer, an operating system is a master control program that runs the computer. The operating system is the first program loaded when the computer is turned on. The operating system is typically loaded by a boot code, which may be part of a basic input/output system (BIOS). The main part of the operating system is called the kernel and resides in memory at all times. The operating system sets the standards for application programs that run on the computer. All programs and applications must talk to the operating system. Operating systems perform various functions, such as providing user interface, job management, task management, data management, device management, and security.

Often times, the operating system will be updated to implement corrections to bugs and errors and to provide new features. Further, updates to operating systems also may be provided to provide support to additional devices. Typically, if the operating system is booted from a local storage device, applications running under the operating system are used to update the image on the local storage device. This method of updating the image on the local storage device occurs with the operating system executing on the data processing system. This operating system is the one booted from the local storage device. If the image for the operating system is corrupted, and the operating system cannot be booted from the local storage device, this method using the operating system cannot be employed.

Therefore, it would be advantageous to have an improved method and apparatus for updating operating system images and recovering from corrupted operating system images on a data processing system.

SUMMARY OF THE INVENTION

The present invention provides a method and apparatus in a data processing system for automatically restoring an operating system on a local storage device. Prior to loading the operating system, a determination is made as to whether the operating system on the local storage device is corrupted in response to starting the data processing system. If the operating system is corrupted, the operating system is repaired using code from a source storage device without loading the operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram of an image in accordance with a preferred embodiment of the present invention;

FIG. 5 is a flowchart of a process for copying a bootable image from a network to a local boot device in accordance with a preferred embodiment of the present invention; and FIG. 6 is a flowchart of the process for automatically recovering from a corrupted boot image in accordance with a preferred embodiment of the present invention.

DETAILED DESCRIPTION OF THE PREFERRED EMBODIMENT

Figure 1:
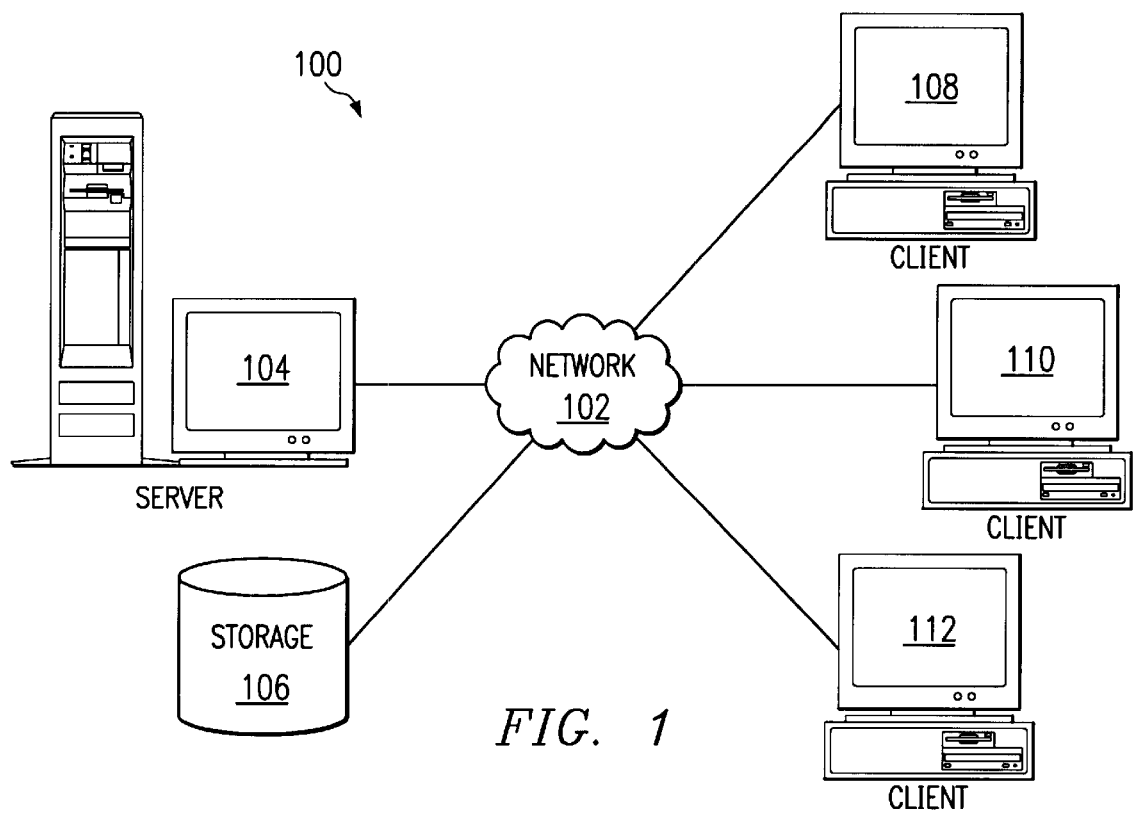
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. FIG. 1 is intended as an example, and not as an architectural limitation for the present invention.

Distributed data processing system 100 may be, for example, the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). In such a case, a client, such as client 108, may examine the operating system when client 108 is started. If the operating system is corrupt or contains errors, the boot code in client 108 may request another copy of the operating system or portions of the operating system to replace or correct the corrupted operating system in client 108.

Further, distributed data processing system 100 may take the form of a manufacturing facility in which clients 108–112 are new computers being manufactured. In this configuration, network 102 takes the form of a local area network. Clients 108–112 have local storage devices installed within them. These local storage devices do not contain an operating system. A BIOS or other boot code also is installed within clients 108–112. When clients 108–112 are started, the boot code looks for an operating system in the local storage device. When an operating system cannot be found, the boot code in these computers look to server 104 to obtain a copy of the operating system. The boot code includes a mechanism to establish a communications link to server 104 across network 102. The operating system is copied onto the local storage devices on clients 108–112. In this manner, a mechanism for creating an initial bootable image on a local storage device is provided without having to have the operating system placed on the local storage device prior to installation of the local storage device.

Figure 2:
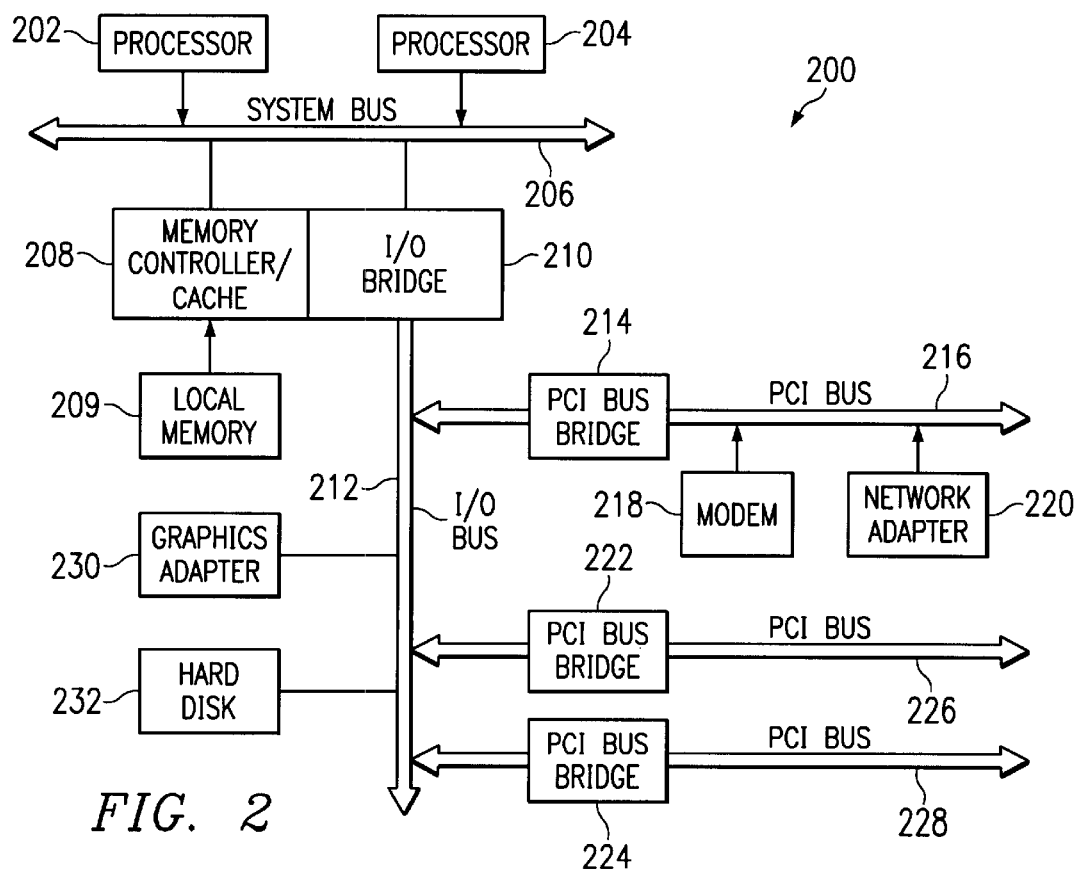
FIG. 2 is a block diagram of a server data processing system that may be implemented as a server in accordance with a preferred embodiment of the present invention.

Referring to FIG. 2, a block diagram of a server data processing system that may be implemented as a server, such as server 104 in FIG. 1, is depicted in accordance with a preferred embodiment of the present invention. Server data processing system 200, in these examples, is a location at which a bootable image may be located. As illustrated below, this bootable image is in the form of an operating system for a client computer.

Sever data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
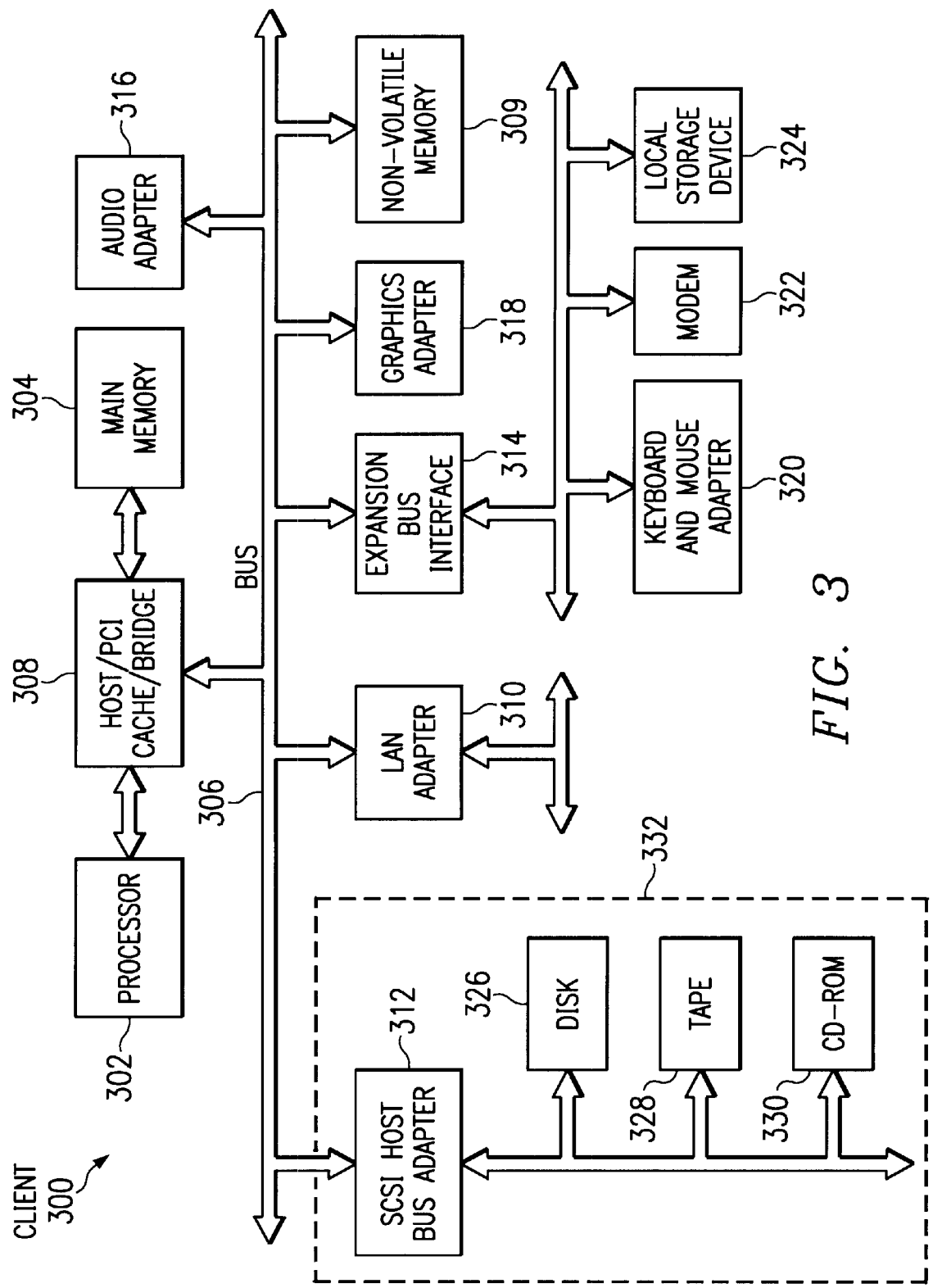
FIG. 3 is a block diagram of a data processing system shown in which the present invention may be implemented.

With reference now to FIG. 3, a block diagram of a data processing system is shown in which the present invention may be implemented. Data processing system 300 is an example of a client, such as client 108, 110, or 112 in FIG. 1, in which code or instructions implementing the processes of the present invention may be located. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Non-volatile memory 309 also is connected to PCI local bus 306 and, in this example, contains a BIOS, which includes a boot code. In this example, non-volatile memory 309 may take the form of a non-volatile random access memory or an erasable programmable read only memory (EPROM). In the depicted examples, the operating system also may be located in non-volatile memory 309.

Additional connections to PCI local bus 306 may be made through direct component interconnection or through add-in boards. In the depicted example, local area network (LAN) adapter 310, small computer system interface SCSI host bus adapter 312, and expansion bus interface 314 are connected to PCI local bus 306 by direct component connection. In contrast, audio adapter 316, and graphics adapter 318 are connected to PCI local bus 306 by add-in boards inserted into expansion slots. Expansion bus interface 314 provides a connection for a keyboard and mouse adapter 320, modem 322, and local storage device 324. Local storage device 324, in this example, contains an image of the operating system. The boot code in non-volatile memory 309 will boot the operating system image located in local storage device 324. Local storage device 324 may take various forms, such as a flash memory. Flash memory is a memory chip than can be rewritten and hold its content without power. Flash memory is a type of non-volatile memory. Flash memory may take various forms, such as a memory stick, which is a flash memory card designed for various devices. These memories typically vary from 4 MB to 192 MB, but may come in larger sizes. Of course, local storage device 324 may take other forms, such as, for example, a floppy disk drive, a CD-ROM, or a read-only memory. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as Windows 2000, which is available from Microsoft Corporation. Instructions for the operating system and applications or programs are located on storage devices, such as hard disk drive 326 and local storage device 324, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent non-volatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash memory in order to provide non-volatile memory for storing operating system files and/or user-generated data.

The depicted example in FIG. 3 and above-described examples are not meant to imply architectural limitations. For example, data processing system 300 also may be a notebook computer, hand held computer, or palmtop in addition to taking the form of a PDA. Data processing system 300 also may be a kiosk or a Web appliance.

The present invention provides a method, apparatus, and computer implemented instructions for enabling boot code to copy an image from a network to a local storage device. In the depicted examples, this image is the operating system that is to be booted. The mechanism of the present invention may be implemented in instructions, such as those found in boot code, which are used to initialize hardware in data processing system 300 and to load the operating system in data processing system 300.

The mechanism of the present invention may be employed in manufacturing to create an initial bootable image on the local storage device. For example, a blank storage device, such as a compact flash card, may be installed during early manufacturing steps. When initially powered, the boot code copies the operating system to the compact flash memory card. In the depicted example, a boot code menu is used to provide a mechanism to point to a file on a server or elsewhere on a network. A user may input a path or universal resource identifier to identify a location of a file or image. The location of this file or image may be stored within a non-volatile storage device. This may be the same device on which the boot code is located.

This mechanism eliminates the need to preprogram a flash memory card prior to installing the flash memory card on a data processing system.

Further, the present invention also provides a mechanism to recover from corruption of an operating system on the local storage device. When the system boots, a check is made to see whether the operating system is a good operating system or whether the operating system is corrupted. If the operating system is corrupted or contains errors, a file or image is read from a network and is used to rebuild or replace the operating system on the local storage device.

Turning next to FIG. 4, a block diagram of an image is depicted in accordance with a preferred embodiment of the present invention. Image 400 includes a header 402 and an operating system 404. Image 400, in this example, is a bootable image. The header 402 is used to process the file while operating system 404 is the file that is to be stored in the local storage device. In this example, header 402 includes an ID field 406, a type field 408, and an error checking (EC) field 410.

ID field 406 is used to identify whether the image is for the local storage device. Further, this field also may be used to identify the type of image. For example, the image for the local storage device is an operating system. In these examples, ID field 406 is a sequence of 4–5 bytes, but may take any form depending on the implementation.

Next, type field 408 is used to identify a type of platform. Hardware platforms may vary depending on the application. The information in this field is used to determine whether the platform on which this image is being loaded is the correct platform. Next, EC field 410 contains a checksum, which is a calculated value used to test data for the presence of errors that can occur when data is transmitted or when it is written to a disk. The checksum is calculated for a chunk of data by sequentially combining all of the bytes of data with a series of arithmetic or logical operations. After the data is transmitted or stored, the new checksum is calculated in the same way using the transmitted or stored data. If the two checksums do not match, then an error has occurred, and the data should be transmitted or stored again. Of course, other mechanisms may be used to determine whether errors are present in the image.

For example, cyclical redundancy checking (CRC) information may be placed in EC field 410. CRC involves using a calculation to generate a number based on the data transmitted. The sending device performs the calculation before transmission and sends the result to a receiving device. The receiving device repeats the same calculation after transmission. If the result is the same then the transmission is assumed to be error free.

Image 400, in these examples, includes an operating system 404. of course, other types of images, such as, for example, an image of boot code may be transferred using this mechanism.

With reference now to FIG. 5, a flowchart of a process for copying a bootable image from a network to a local boot device is depicted in accordance with a preferred embodiment of the present invention. This process may be implemented in boot code in these examples.

The process begins by initializing the hardware (step 500). Next, a network connection is established to the network (step 502). Thereafter, a specified file is downloaded from the network (step 504). The file may be identified using a resource identifier, which may be, for example, a path name or a universal resource locator. The location of the file may be specified using a number of different mechanisms. For example, boot code menus may provide a mechanism for specifying the location of the file in which this location is stored in a NVRAM. If the location is stored in a NVRAM, this location also may be specified through the use of an application running on the operating system.

Alternatively, the location of the file may be specified using standard network operations, such as, for example, dynamic host configuration protocol (DHCP) and boot strap protocol (BOOTP). These protocols are used to allow network computers to obtain IP addresses and to access other information. Location information for a file may be provided through these protocols.

After the file is downloaded, a header in the file is parsed (step 506). A determination is then made as to whether this is an image for the local storage device (step 508).

If the image is for the local storage device, a determination is then made as to whether the image is a good image (step 510). Step 510 is used to see whether the image is corrupted. The determination as to whether the image is for a local storage device, such as a flash memory, may be made in a number of different ways. For example, a header may be placed at the beginning of the file in which error checking information, such as a checksum or CRC, is located. This information is used to determine whether errors have occurred in transmission of the image from the network to the data processing system. If the image is a good image, the local storage device is updated with the image (step 512) with the process terminating thereafter.

With reference again to step 510, if the image is not a good image, then an error message is generated (step 514) with the process terminating thereafter. With reference again to step 508, if the image is not an image for the local storage device then the file is executed (step 516) with the process terminating thereafter.

With reference now to FIG. 6, a flowchart of the process for automatically recovering from a corrupted boot image is depicted in accordance with a preferred embodiment of the present invention.

The process begins by initializing the hardware (step 600). Thereafter, the image is loaded from the local storage device (step 602) then the file is checked (step 604). The check may be implemented using various mechanisms for error checking. The information used for error checking may be located in a header, such as header 402 in FIG. 4. For example, a checksum, a cyclical redundancy check (CRC), or some other similar method may be used for checking for errors.

A determination is made as to whether the file is corrupted based on the check (step 606). If the file is corrupted, then a determination is made as to whether a recovery file is specified (step 608). The specification of this file may be located in a memory on the system, such as a non-volatile random access memory (NVRAM) in which the boot code is located. Of course, other non-volatile storage may be used to indicate such a file. If a recovery file is specified, then the recovery file is loaded and an update is made to the local storage device to correct for the corruption (step 610) with the process then returning to step 600 to reboot the system. The location of the file may be identified in a fashion similar to that in FIG. 5. When a corrupt or bad kernal is to be replaced on the local storage device, the location of the file for the kernal is typically read from the NVRAM.

With reference again to step 608, if a recovery file is unspecified, then an error is generated (step 614) with the process terminating thereafter. With reference back to step 606, if the check indicates that file corruption is absent, then the operating system is booted (step 612) with the process terminating thereafter.

Thus, the present invention provides an improved method, apparatus, and computer implemented instructions for copying images or recovering from corrupted images on the local storage device. In particular, the mechanism may be used to create, update, or replace images, such as, for example, operating system images, on a local storage device. The mechanism of the present invention also provides a mechanism for recovering from a corrupted operating system. This mechanism avoids having to replace a local storage memory or boot the operating system from a server and run an application to rebuild the operating system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for automatically restoring an operating system on a local storage device in a data processing system, comprising the steps of;

determining whether the operating system on the local storage device is corrupted in response to starting the data processing system; and repairing the operating system using code from a source storage device without loading the operating system if the operating system is corrupted.

2. The method of claim 1, wherein the step of repairing the operating system comprises:

replacing the operating system on the local storage device.

3. The method of claim 1, wherein the repairing step comprises:

copying a kernel for the operating system from the source storage device to the local storage device;

loading the kernel; and passing control to the kernel.

4. The method of claim 3, wherein the kernel performs any additional repairs to place the operating system in an uncorrupted condition.

5. The method of claim 3 further comprising:

restarting the data processing system prior to loading the kernel.

6. The method of claim 1, wherein the repairing step comprises:

establishing a network connection to a server;

copying a kernel for the operating system from the source storage device on the server to the local storage device;

loading the kernel; and passing control to the kernel.

7. The method of claim 6 further comprising copying other portions of the operating system from the source storage device to the local storage device.

8. The method of claim 1, wherein the determining and repairing steps are performed by a boot code.

9. The method of claim 8, wherein the boot code is located in a non volatile memory in the data processing system.

10. The method of claim 1, wherein the local storage device is one of a nonvolatile random access memory, a hard disk drive, a floppy disk drive, a CD-ROM, and a DVD-ROM.

11. The method of claim 1, wherein error checking information is present on the data processing system and wherein the determining step is performed using the error checking information.

12. A data processing system comprising:

a bus;

a non volatile memory connected to the bus, wherein a boot code is located in the nonvolatile memory;

a local storage device connected to the bus; and a processor connected to the bus, wherein the processor executes the boot code to determine whether an operating system is present in the local storage device, and copies the operating system from a remote location to the local storage device through a data link from the data processing system to the remote location if the operating system is absent from the local storage device.

13. The data processing system of claim 12, wherein the non volatile memory is a non volatile random access memory.

14. The data processing system of claim 12, wherein the local storage device is a non volatile random access memory, hard disk drive, floppy disk, CD-ROM, and DVD-ROM.

15. The data processing system of claim 12, wherein the data processing system is a laptop computer, palmtop computer, personal computer, and personal digital assistant.

16. A data processing system for automatically restoring an operating system on a local storage device the data processing system comprising:

determining means for determining whether the operating system on the local storage device is corrupted in response to starting the data processing system; and repairing means for repairing the operating system using code from a source storage device without loading the operating system if the operating system is corrupted.

17. The data processing system of claim 16, wherein the repairing means comprises:

replacing means for replacing the operating system on the local storage device.

18. The data processing system of claim 16, wherein the repairing means comprises:

copying means for copying a kernel for the operating system from the source storage device to the local storage device;

loading means for loading the kernel; and passing means for passing control to the kernel.

19. The data processing system of claim 18, wherein the kernel performs any additional repairs to place the operating system in an uncorrupted condition.

20. The data processing system of claim 18 further comprising:

restarting means for restarting the data processing system prior to loading the kernel.

21. The data processing system of claim 16, wherein the repairing means comprises:

establishing means for establishing a network connection to a server;

copying means for copying a kernel for the operating system from the source storage device on the server to the local storage device;

loading means for loading the kernel; and passing means for passing control to the kernel.

22. The data processing system of claim 21 further comprising:

copying means for copy other portions of the operating system from the source storage device to the local storage device.

23. The data processing system of claim 16, wherein the determining means and repairing means are performed by a boot code.

24. The data processing system of claim 23, wherein the boot code is located in a non volatile memory in the data processing system.

25. The data processing system of claim 16, wherein the local storage device is one of a nonvolatile random access memory, a hard disk drive, a floppy disk drive, a CD-ROM, and a DVD-ROM.

26. The data processing system of claim 16, wherein error checking information is present on the data processing system and wherein the determining means is performed using the error checking information.

27. A computer program product in a computer readable medium for automatically restoring an operating system on a local storage device, the computer program product comprising:

first instructions for determining whether the operating system on the local storage device is corrupted in response to starting the data processing system; and second instructions for repairing the operating system using code from a source storage device without loading the operating system if the operating system is corrupted.

* * * * *

UNITED STATES PATENT AND TRADEMARK OFFICE
CERTIFICATE OF CORRECTION

PATENT NO.   : 6,625,754 B1
DATED        : September 23, 2003
INVENTOR(S)  : Aguilar et al.

It is certified that error appears in the above-identified patent and that said Letters Patent is hereby corrected as shown below:

<u>Column 10,</u>
Line 21, after "for" delete "copy" and insert -- copying --.

Signed and Sealed this

Twentieth Day of January, 2004

JON W. DUDAS
*Acting Director of the United States Patent and Trademark Office*